UNITED STATES PATENT OFFICE.

THOMAS S. CAUSEY, OF ARLINGTON, TEXAS, ASSIGNOR OF ONE-TWELFTH TO WM. DUGAN, OF ARLINGTON, TEXAS.

COMPOSITION OF MATTER TO BE INTRODUCED INTO THE INNER TUBES OF PNEUMATIC TIRES FOR RENDERING THE TIRES PUNCTURE-PROOF.

1,062,535. Specification of Letters Patent. Patented May 20, 1913.

No Drawing. Application filed December 16, 1912. Serial No. 736,985.

*To all whom it may concern:*

Be it known that I, THOMAS S. CAUSEY, citizen of the United States, residing at Arlington, in the county of Tarrant and State of Texas, have invented a new and useful Composition of Matter to be Introduced into the Inner Tubes of Pneumatic Tires for Rendering the Tires Puncture-Proof, of which the following is a specification.

My composition consists of the following ingredients, combined in substantially the proportions stated, viz: dextrin 1 pound, ground asbestos (mineral wool) 1 pound, powdered magnesia 1 pound, glycerin 1½ ounces, wood alcohol ½ pint, water enough to produce a gallon of the composition.

It will, of course, be understood that sufficient dye stuff may be added to give the composition any desired color. The ingredients above-specified are to be thoroughly mingled by agitation. The dry materials (asbestos and magnesia and dextrin) will preferably be mixed separately from the liquid ingredients, the latter being added later.

The composition produced by combining the ingredients specified, in substantially the proportions stated, will be of a semi-fluid nature flowing somewhat like syrup. To prevent tires from leaking and to heal punctures, a few pounds of the composition are introduced into a tire through the valve aperture. When the tire is subsequently being used, the composition will spread over the entire interior surface of the tire, adhering thereto due to its semi-fluid nature. A surplus of the composition will tend to maintain a position adjacent to the ground during the rotation of the wheel upon which the tire is mounted, and as soon as a puncture occurs, the air in attempting to escape, forces the material into the puncture, the escape of air thus being blocked. The air within the tire will, of course, be under sufficient compression to prevent the composition from returning into the tire, and unless the puncture is an unusual size, the composition will not be forced entirely through the puncture because its nature is only partially fluid.

What I claim is:

1. The herein described composition of matter, consisting of dextrin, ground asbestos, magnesia, glycerin, wood alcohol and water, substantially as described and for the purpose specified.

2. The herein described composition of matter for preventing leaks in pneumatic tires, consisting of dextrin, one pound; ground asbestos, one pound; magnesia, one pound; glycerin, one and one-half ounces; wood alcohol, one-half pint; and enough water to produce a gallon of the composition.

In testimony whereof I have signed my name to this specification in the presence of two subscribing witnesses.

THOMAS S. CAUSEY.

Witnesses:
 D. B. CARR,
 J. S. MURRAY.